(12) United States Patent
Iwami et al.

(10) Patent No.: US 6,304,635 B1
(45) Date of Patent: *Oct. 16, 2001

(54) CALL CONTROL MANAGEMENT SYSTEM

(75) Inventors: Yasuo Iwami; Tomokiyo Yoshimatsu; Kiyomi Akimoto, all of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/019,683

(22) Filed: Feb. 6, 1998

(30) Foreign Application Priority Data

Aug. 26, 1997 (JP) .................................................. 9-230048

(51) Int. Cl.[7] .................................................. H04M 15/00
(52) U.S. Cl. ................ 379/34; 379/114.01; 379/114.08; 379/112.05
(58) Field of Search .................................... 379/112, 113, 379/114, 115, 116, 119, 121, 127, 34

(56) References Cited

U.S. PATENT DOCUMENTS

| | | | | |
|---|---|---|---|---|
| 5,062,103 | * | 10/1991 | Davidson et al. | 379/112 |
| 5,511,113 | * | 4/1996 | Tasaki et al. | 379/112 |
| 5,737,399 | * | 4/1998 | Witzman et al. | 379/112 |
| 5,757,897 | * | 5/1998 | LaBarbera et al. | 379/112 |
| 5,778,182 | * | 7/1998 | Cathey et al. | 395/200.49 |
| 5,848,143 | * | 12/1998 | Andrews et al. | 379/219 |
| 5,862,203 | * | 1/1999 | Wulkan et al. | 379/114 |
| 5,867,562 | * | 2/1999 | Scherer | 379/88 |
| 5,878,113 | * | 3/1999 | Bhusri | 379/112 |
| 5,878,114 | * | 3/1999 | Son | 379/34 |
| 5,946,386 | * | 8/1999 | Rogers et al. | 379/265 |
| 6,011,838 | * | 1/2000 | Cox | 379/113 |
| 6,226,373 | * | 5/2001 | Zhu et al. | 379/207 |

* cited by examiner

Primary Examiner—Sinh Tran
Assistant Examiner—Quoc D. Tran
(74) Attorney, Agent, or Firm—Helfgott & Karas, P C (57) ABSTRACT

A call control management system is constructed causing no deterioration in performance relative to call control even when utilizing a totalizing function. The call control management system includes a call control system and a call information management system. The call control system outputs, every time the transition of a status of a call under control is made, a record showing a status after the call transition to a call status information log file. The call information management system extracts a record about the same call from the call status information log file, creates a record containing at least data convertible into a call charge on the basis of the extracted record, and stores the call information collecting log file with the created record. The call information management system, when indicated to output accounting information and traffic information etc, creates and outputs information indicated to be outputted based on the information stored in the call information collecting log file.

5 Claims, 7 Drawing Sheets

ENVIRONMENT DATA TABLE

| TELEPHONE NUMBER | BOARD ID | BOARD TYPE | CHANNEL NUMBER | CHANNEL TYPE | LINE TYPE | TERMINAL TYPE | REGULATION |
|---|---|---|---|---|---|---|---|

FIG. 2C

SW INFORMATION COLLECTING LOG FILE

| APPLICATION NAME | ACS HANDLE | INVOKED ID | PRIMITIVE | CALLING DEVICE ID | CALLED DEVICE ID | TIME/DATE | ACCOUNT CODE | CALL ID |
|---|---|---|---|---|---|---|---|---|
| Agent App.A | 001 | xxxx | MakeCall | 044-xxx-xxxx | 2000 | 96/09/08-11:28:35 | yyyyyyyyyyy | 001 |
| Agent App B | 001 | xxxx | Established | 044-xxx-xxxx | 2000 | 96/09/08-11:28:40 | yyyyyyyyyyy | 001 |
| Agent App C | 001 | xxxx | Con.Cleared | 044-xxx-xxxx | 2000 | 96/09/08-11:30:30 | yyyyyyyyyyy | 001 |

FIG. 2D

APPLICATION INFORMATION COLLECTING LOG FILE

| TIME/DATE | CALL ID | NOTIFICATION CODE | TYPE | USER NAME | SIZE |
|---|---|---|---|---|---|
| 96/09/08-11:28:35 | 001 | 1001 | Mail Read | zzzzz | 30 |
|  |  |  |  |  |  |
|  |  |  |  |  |  |

FIG. 2E

RECTANGULAR SECTION NUMBER TABLE

| TRUNK PREFIX | NUMBER AREA | RECTANGULAR SECTION NUMBER |
|---|---|---|

FIG. 2F

DISTANCE-BASIS POSSIBLE-OF-CALL TIME TABLE

| DISTANCE | DAYTIME | NIGHT TIME | MID-NIGHT |
|---|---|---|---|

FIG. 2G

CALL INFORMATION COLLECTING LOG FILE

| CALL ID | TIME/DATE | CALLING USER NUMBER | CALLING TERMINAL TYPE | CALLED USER NUMBER | CALLED TERMINAL TYPE | CALL TIME | CHARGE | CALL COMPLETION INDICATION |
|---|---|---|---|---|---|---|---|---|
| 001 | 96/09/08-11:28:35 | 044-xxx-xxxx | | 2000 | Analog(20p) | 00:01:55 | 10 | Normal |
| | | | | | | | | |

FIG. 2H

APPLICATION RELATED CALL INFORMATION LOG FILE (for Agent Appl. A)

| TIME/DATE | CALLING USER NUMBER | CALLED USER NUMBER | CALL TIME | CHARGE | NOTIFICATION CODE | TYPE | USER NAME | SIZE |
|---|---|---|---|---|---|---|---|---|
| 96/09/08-11:28:35 | 044-xxx-xxxx | 2000 | 00:01:55 | 10 | 1001 | Mail Read | ZZZZZ | 30 |
| | | | | | | | | |

FIG. 3

SCENARIO DATA FILE

| APP.NAME | CITATION TARGET LOG NAME | CITATION ITEM NAME |
|---|---|---|
| Agent App.A | CALL INFORMATION COLLECTING LOG | TIME/DATE |
| Agent App.A | CALL INFORMATION COLLECTING LOG | CALLING USER NUMBER |
| Agent App.A | CALL INFORMATION COLLECTING LOG | CALLED USER NUMBER |
| Agent App.A | CALL INFORMATION COLLECTING LOG | CALL TIME |
| Agent App.A | CALL INFORMATION COLLECTING LOG | CHARGE |
| Agent App.A | APPLICATION INFORMATION COLLECTING LOG | NOTIFICATION CODE |
| Agent App.A | APPLICATION INFORMATION COLLECTING LOG | TYPE |
| Agent App.A | APPLICATION INFORMATION COLLECTING LOG | USER NAME |
| Agent App.A | APPLICATION INFORMATION COLLECTING LOG | SIZE |
| . | . | . |
| . | . | . |
| . | . | . |
| . | . | . |
| . | . | . |

FIG. 4

CALL CONTROL MANAGEMENT SYSTEM

BACKGROUND OF THE INVENTION

1. Field of the Invention

The present invention relates to a call control management system and, more particularly, to a call control management system for controlling calls and managing (totalizing/outputting) accounting information and traffic information.

2. Description of the Related Art

A switching system is normally provided with a function of calculating a call charge for a call initiated by an extension terminal, and totalizing and outputting call charges on a variety of units such as an extension unit, a station unit and so on. This function is hereinafter termed an accounting information totalizing function. Further, the switching system is also provided with a function of obtaining and outputting activity ratios of respective extension terminals and respective trunks. This function is termed hereinafter a traffic information totalizing function.

In the prior art switching system, a call control system is constructed to incorporate the accounting information totalizing function and the traffic information totalizing function. Therefore, when each totalizing function is executed, it might happen that a call control performance of the call control system is to deteriorate. Moreover, the accounting information function and the traffic totalizing function serve for managing the totalized data independently, and hence memory resources are consumed with a futility in the prior art system.

Further, over the recent years, it has been practiced that computers are connected to a telephone switching network, which is called a CTI (Computer-Telephone Integration). On the occasion of connecting the computer to the telephone switching network, a call control application is added. As in the prior art, however, the call control system is provided with the accounting information totalizing function and the traffic information totalizing function, this requires a change in each totalizing function every time the call control application is added.

Under such circumstances, it is a first object of the present invention to provide a call control management system capable of preventing a deterioration in performance relative to call control even when utilizing a totalizing function.

It is a second object of the present invention to provide a call control management system capable of effectively utilizing memory resources.

It is a third object of the present invention to provide a call control management system capable of easily adding a call control application.

SUMMARY OF THE INVENTION

To accomplish the above objects, according to the present invention, a call control management system for performing communications via a telephone line network, comprises a call control unit, having a call status information log file for storing a call status record showing a certain call status at a certain time, for implementing call control and outputting, every time the call status transition is made, the call status record showing a status after the call transition to said call status information log file, and a call information management unit for extracting the call status record relative to the same call from the call status information log file, creating a call information record containing at least data convertible into a call charge on the basis of the extracted record, and storing the created call information record in the form of a file.

Thus, in the call control management system according to the present invention, the call control unit, in addition to the call control, executes only a process of outputting the call status record to the call status information log file. A process required for outputting the accounting information and the traffic information is executed not by the call control unit but by the call information management unit. Hence, according to this call control management system, the first object can be accomplished.

When constructing the call control management system according to the present invention, a unit, which may be adopted as the call control unit, when starting the control relative to a new call, allocates unique call identification data to this call, indicates, each time the call status transition is made, a status after the call transition, and outputs a call status record containing the call identification data allocated to the call to the call status information log file. A unit that may be adopted as the call information management unit extracts the call status record pertaining to the same call from the call status information log file by use of the call identification data.

Further, when constructing the call control management system in this way, a unit that may be used as the call information management unit extracts only the call status record needed for creating the call information record on the same call from the call status information log file. In case the call information management unit is thus constructed, a quantity of the information transferred to the call information management unit from the call control unit (the call status information log file) can be set to the minimum required. Therefore, in the case of using a communication line (e.g., a LAN line) employed also by other devices in order to connect toe call control unit to the call information management unit, it is desirable that the above construction be adopted.

Further, the call information management unit creates a call information record in which accounting information and traffic information can be totalized, and outputs, when indicated to output the accounting information or the traffic information, a result of totalizing the call information records stored in the form of the file on the basis of a content of the indication. With this call information management unit employed, the call control management system capable of accomplishing the second object given above is to be obtained.

Then, the call control management system further comprises an application unit for controlling the call control unit in order to implement a service of connecting the telephone line network to a computer, this application unit having an application information log file for storing a record showing a content of the service implemented, and storing the application information log file with the record showing the content of the service when starting the service. Then, the call information management unit, when indicated to output information based on service units, outputs information on a designated service by combining the record stored in the application information log file with the call information record stored in the form of the file. With this call information management unit used, the call control management system capable of accomplishing the third object given above is to be obtained.

BRIEF DESCRIPTION OF THE DRAWINGS

Other objects and advantages of the present invention will become apparent during the following discussion in conjunction with the accompanying drawings, in which.

DETAILED DESCRIPTION OF THE PREFERRED EMBODIMENTS

Illustrative embodiments of the present invention will hereinafter be specifically described with reference to the accompanying drawings.

Figure 1:
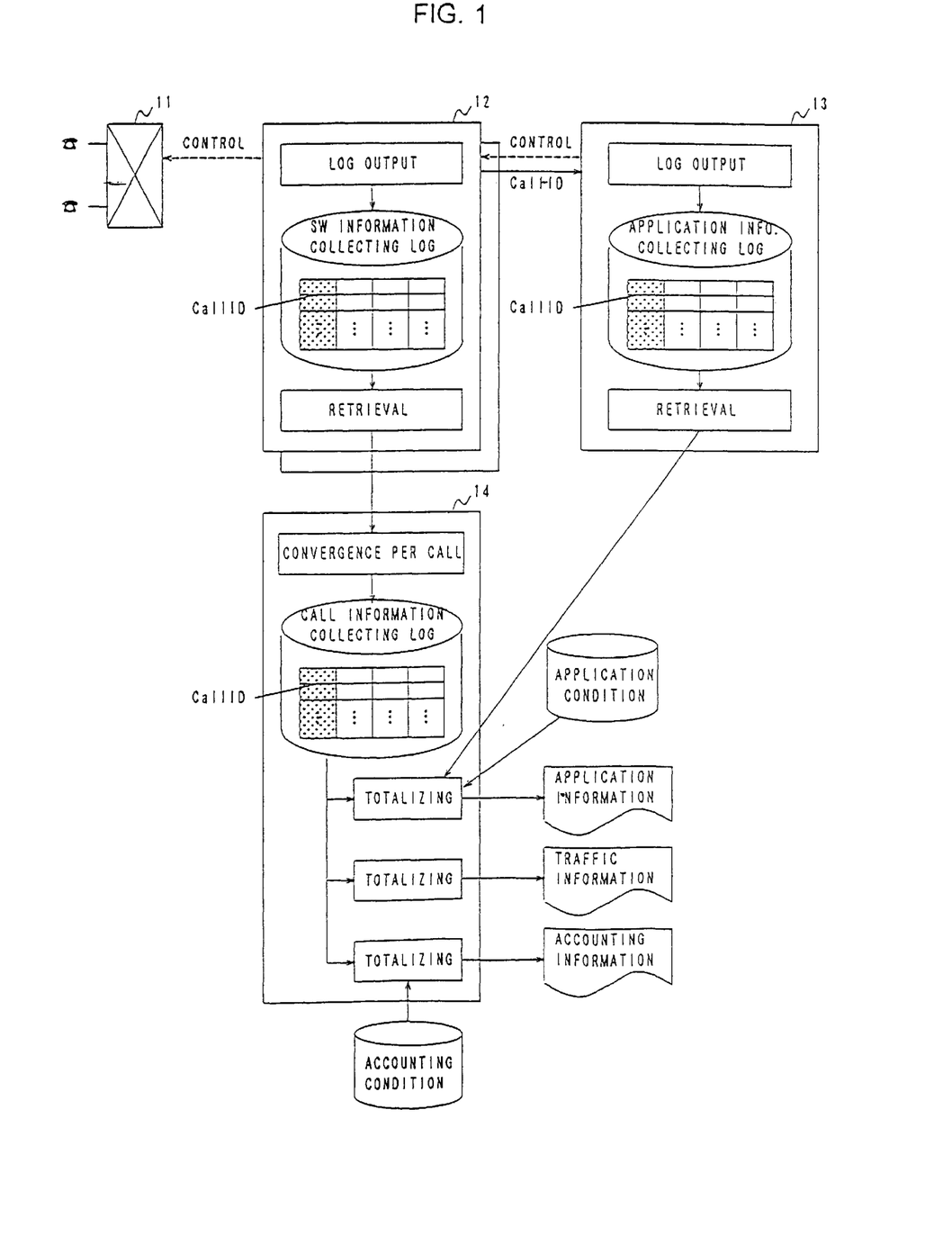
FIG. 1 is a block diagram schematically showing a construction of a call control management system in an embodiment.

FIG. 1 schematically shows a construction of a call control management system in one embodiment of the present invention. To start with, a construction and operations of the call control management system in the embodiment will be outlined with reference to this block diagram.

As shown in FIG. 1, the call control management system in the embodiment is constructed of a switching system 11, a call control system 12, a call control application unit 13 and a call information management system 14.

The switching system 11 actually executes a switching process.

The call control system 12 controls the switching system 11 in accordance with an indication given from the call control application unit 13. The call control system 12 includes an SW information collecting log file and, when a call status transition is made, outputs a record showing a status after this call transition to the SW information collecting log file.

The SW information collecting log file is structured so that the call information management system 14 is capable of updating contents of this file. Further, the SW information collecting log file is stored with a record containing "CallID"."CallID" is defined as an item of data used inside in common to the call control system 12, the call control application unit 13 and the call information management system 14. A value of "CallID" is determined by the call control system 12, and the call control application unit 13 is notified of this value. More specifically, the call control system 12, when-indicated to set the call from the call control application unit 13, determines the value of "CallID" to be used for this call. Then, the call control application unit 13 is notified of the determined value in order to make a data management based on "CallID" possible.

The call control application unit 13 controls the call control system 12 (the switching system 11) in order to implements a service of connecting a computer to a telephone line network. The call control application unit 13 includes an application information collecting log file for storing a record showing a situation of execution of an application (a service). The application information collecting log file is structured to store the record containing "CallID", and the call control application unit 13, when generating a record for the application information collecting log file, utilizes "CallID" notified from the call control system 12. Note this application information collecting log file is also structured so that the call information management system 14 is capable updating contents of this file.

The call information management system 14, when predetermined conditions are prepared (when a previously designated time is reached, and when a predetermined indication is inputted from a user), collects records within the SW information collecting log file. Then, the call information management system 14 generates a single record usable for totalizing pieces of traffic information as well as for totalizing pieces of accounting information, which consist of a call transmitter number, a call receiver number and a call time etc, for every several records with the same value of "CallID" set within the record, and outputs the generated record to the call information collecting log file held inside. Then, the call information management system 14 totalizes the traffic information from the users and also totalizes, when indicated to totalize the accounting information, the records stored in the call information collecting log file on the unit according to a content of the indication, thereby creating and outputting the accounting information and the traffic information.

Further, the call information management system 14, when indicated to output the information on the unit of application, creates the application information defined as information on the indicted application by use of the records stored in the application information log file and the records within the call information collecting log file, and then output the application information.

Namely, in the call control management system in the embodiment, the call control system executes, in addition to the call control, only a process of outputting the record indicating the call status to the SW information collecting log file, and the processes required for outputting the accounting information and the traffic information are implemented not by the call control system but by the call information management system. Further, the call information management system outputs the accounting information and the traffic information on the basis of the same data.

Figure 2A:
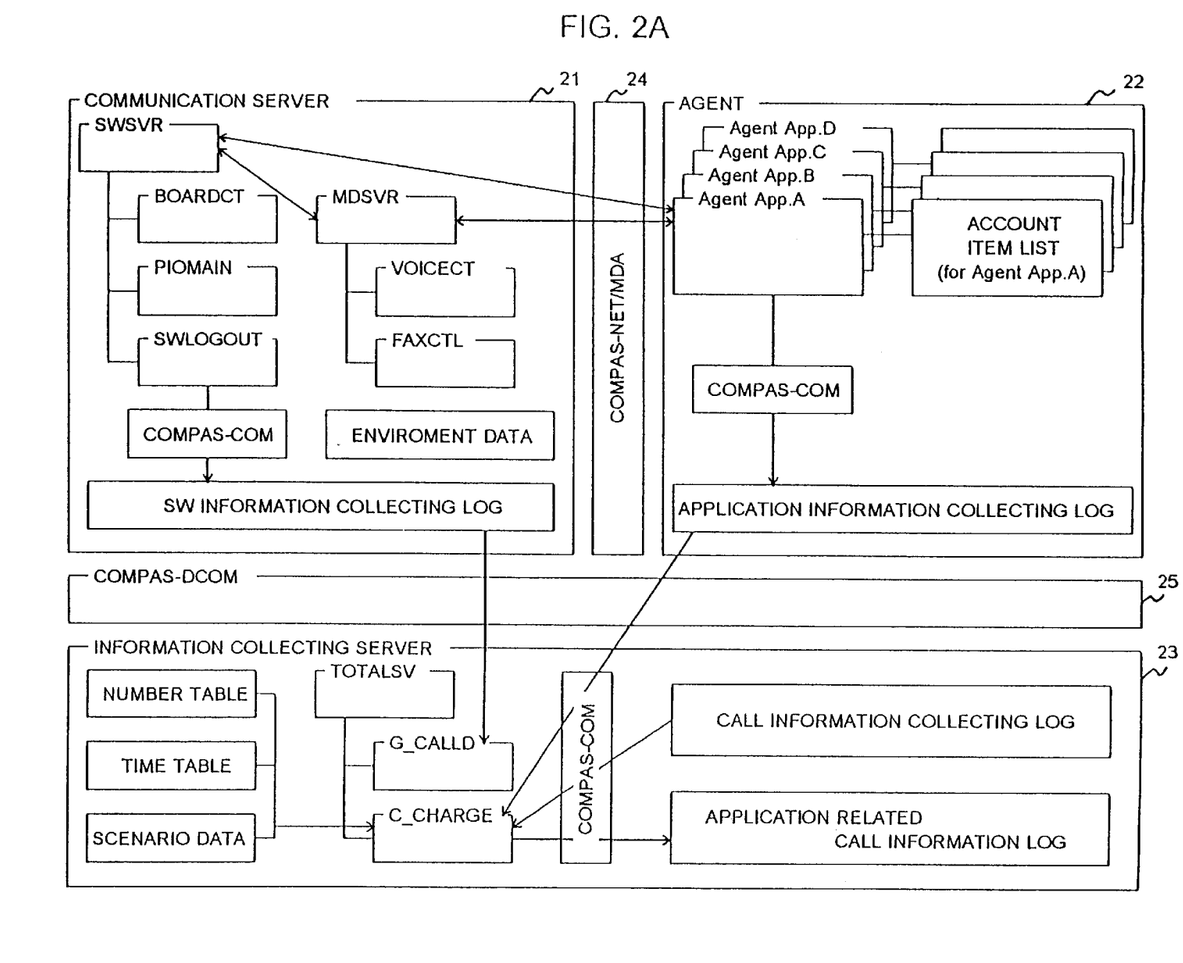
FIG. 2A is a block diagram illustrating a construction of a call control management system in a second embodiment.

FIG. 2A illustrates the construction of the call control management system in a second embodiment of the present invention. As shown in FIG. 2A, the call control management system in the second embodiment includes a communication server 21, an agent unit 22 and an information totalizing server 23 as principal components. Note that the communication server 21, the agent unit 22 and the information totalizing server 23 correspond respectively to the call control system 12, the call control application unit 13 and the call information management system 14 in FIG. 1, and in FIG. 2A an illustration of an apparatus corresponding to the switching system 11 is omitted.

The call control management system of the second embodiment has such a construction that an apparatus incorporating two components functioning as the communication server 21 and the agent unit 22, is connected via a so-called LAN line to an apparatus (a computer) functioning as the information totalizing server 23. The communication server 21 and the agent unit 22 are constructed to transfer and receive the information between the call control system represented by Versit-TSAPI and the call control application via a COMPAS-NET/MDA 24 defined as an interface library. The information totalizing server 23 and the communication server 21 or the agent unit 22 are constructed to transfer and receive the information via a COMPAS-DCOM 25 defined as a communication library for transferring information between systems dispersed on WAN/LAN.

The agent unit 22 is stored with a certain number agent applications defined as programs for connecting the telephone switching network to the computers and different from each other in terms of their applications (purposes). Further, the agent unit 22 is stored with COMPAS-COM defined as a common library for accessing a database, and each agent application, when executed, functions to output the record containing CallID (which will be explained in detail later on) determined by the communication server 21 to the application information collecting log file (see FIG. 2D) via COMPAS-COM. Note that the application information collecting log file is, though only one log file is shown in FIG. 2A, generated per agent application.

Figure 2B:
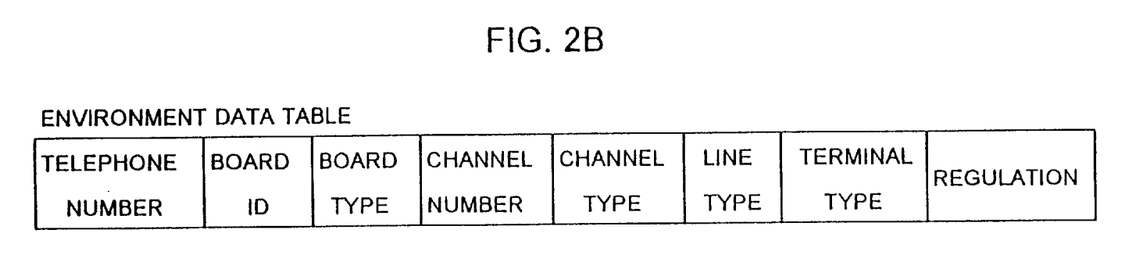
FIG. 2B–2H are an explanatory diagram showing constructions of tables and files used in the call control management system in the second embodiment.
Figure 2C:
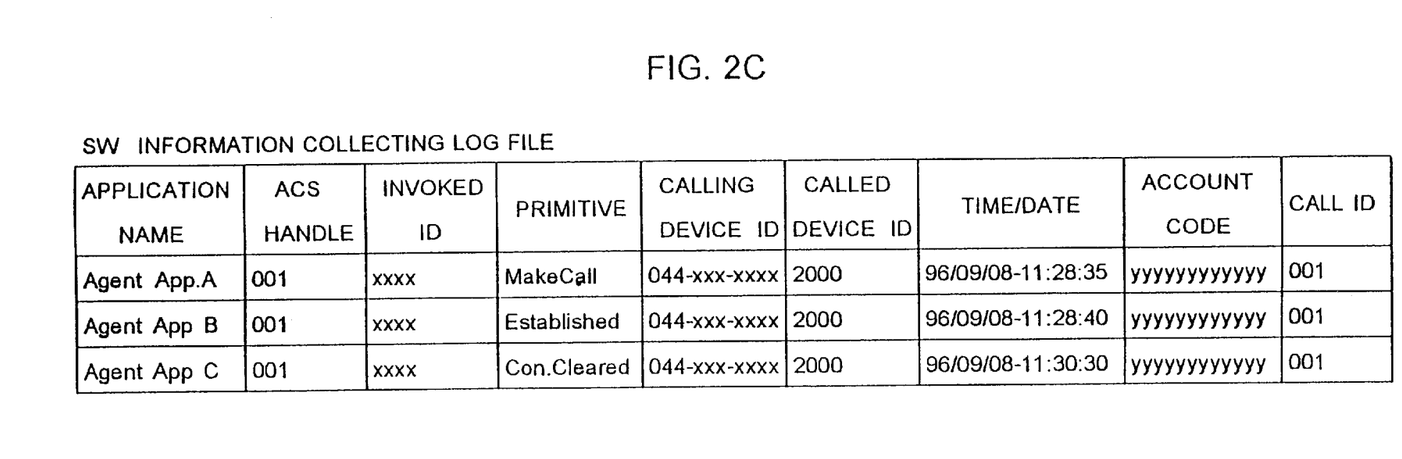

The communication server 21 includes a switch server SWSVR classified as a program for controlling the switching system including BOADCT, PIOMAIN, SWLOGOUT and so on. BOADCT and PIOMAIN are programs for implementing board control and PIO line control, respectively. SWLOGOUT is a program for updating a switch (SW) information collecting log file (FIG. 2C) in the communication server 21. Further, the communication server 21 includes a media server MDSVR containing a voice control program VOICECT, and a FAX control program FAXCTL. Moreover, the communication server 21 is stored with COMPAS-COM defined as the common library for accessing the database, and an environment data table. The environment data table, as shown in FIG. 2B, contains a telephone number, a board ID and so on.

The communication server 21 (SWSVR), when receiving a command ("MakeCall"for requesting new call setting from any one of the agent applications within the agent unit 22, determines CallID allocated to this call. Then, the communication server 21 outputs, to the SW information collecting log file (FIG. 2C), a record containing CallID determined, a name of application which requested the call setting, a telephone number and a status-transition time (Time/Date), and notifies the agent application issuing the command "MakeCall", of CallID determined. Subsequently, the communication server 21 executes the control necessary for setting the call requested with reference to the environment data table and, when the call status transition is made, outputs a record showing a status after the transition to the SW information collecting log file.

The information totalizing server 23 is stored with a program TOTALSV containing a program G_CALLD for creating the call information collecting log file (FIG. 2G) by reading contents of the SW information collecting log file and a program C_CHARGE for calculating and outputting charge data, and with the program COMPAS-COM for accessing the database. Further, the information totalizing server 23 is stored with a rectangular section number table (FIG. 2E) and a distance-basis possible-of-calling time table (FIG. 2F) containing information needed for calculating a call charge from the calling number and the call time. Incidentally, the information totalizing server 23, though the illustration is omitted, operates in such a status as to hold a copy of the environment data table within the communication server 21.

Figure 2D:
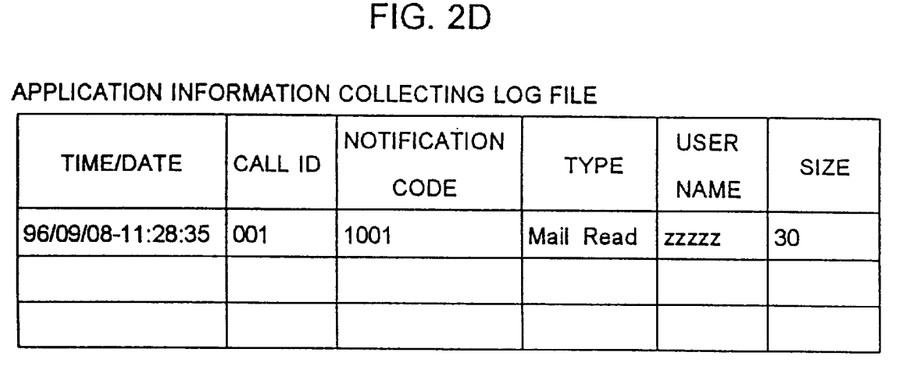
Figure 2E:
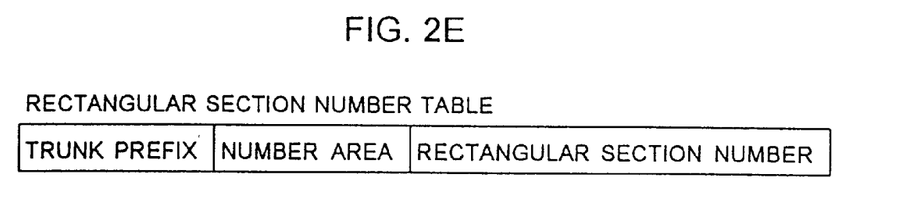
Figure 2F:
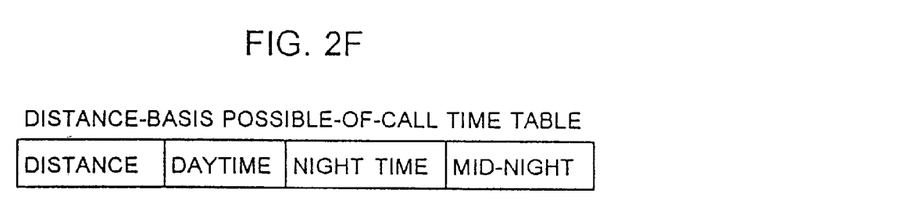
Figure 2G:
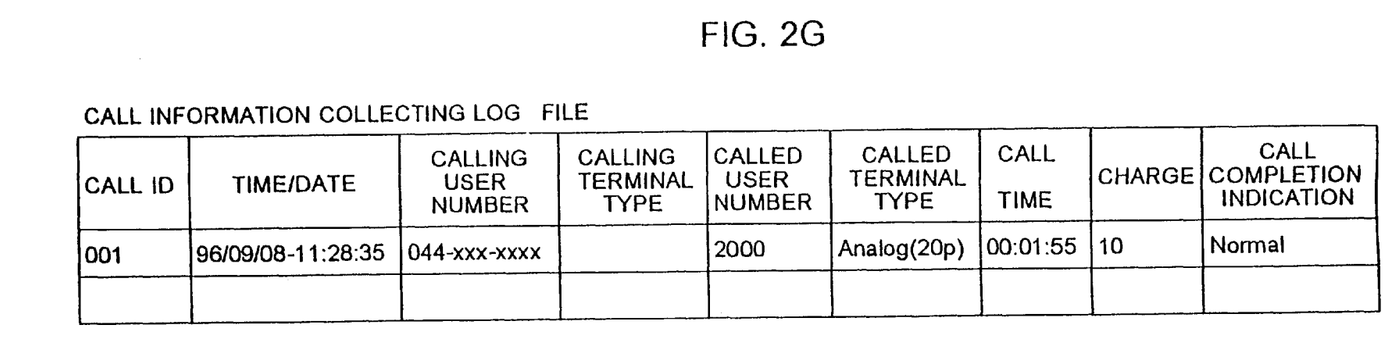
Figure 2H:
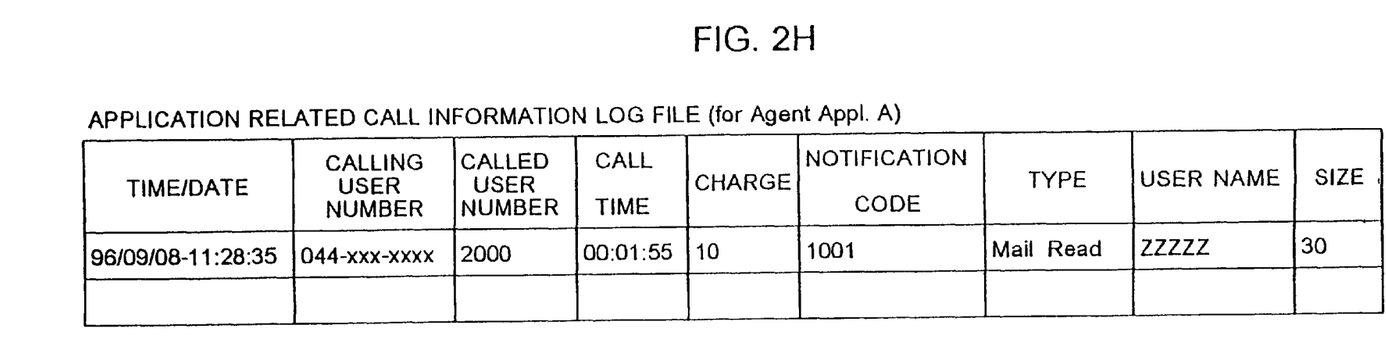

Moreover, the information totalizing server 23 is stored with a scenario data file used when creating an application related call information log file (FIG. 2H).

Figure 3:
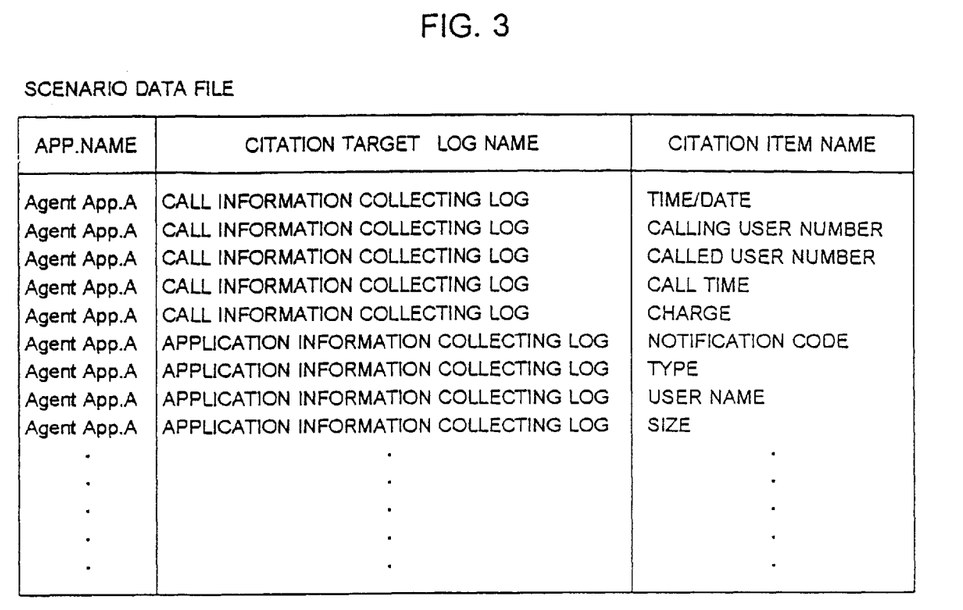
FIG. 3 is an explanatory diagram showing a construction of a scenario data file used in the call control management system in the second embodiment.

The scenario data file serves to retain, as shown in FIG. 3, a plurality of records consisting of an application name, a citation target log name and a citation item name. When the agent applications are added to the agent unit 22, a certain number of records pertaining to the added agent applications are added to the above scenario data file.

An operation of the information totalizing server 23 will hereinafter be specifically described. At the first onset, there is explained the operation of the information totalizing server 23 when indicated to create (add the record to the call information collecting log file) the call information collecting log file.

Figure 4:
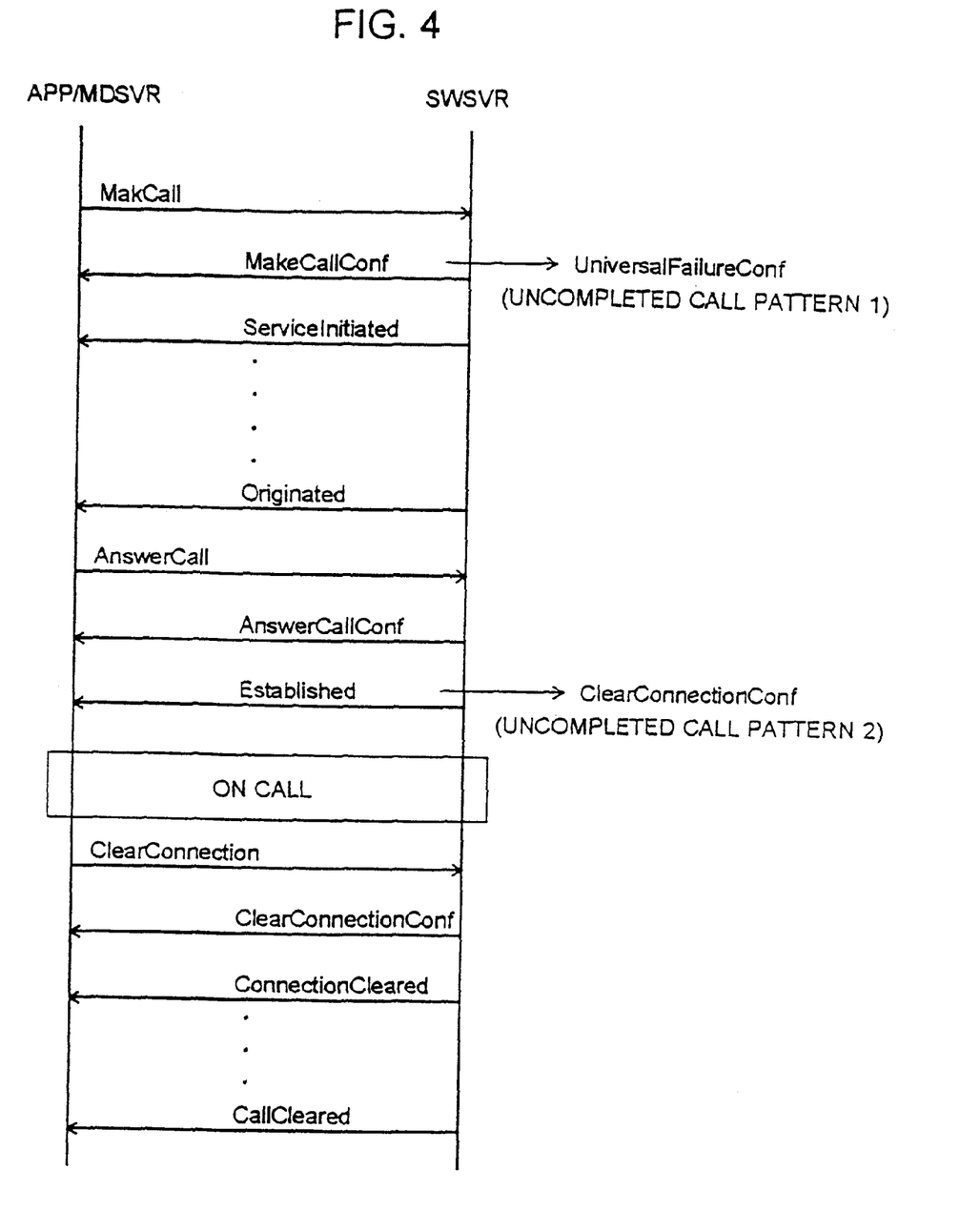
FIG. 4 is an explanatory sequence diagram showing an operation of the call control management system in the second embodiment.

In the call control management system in the second embodiment, the information is transferred and received in procedures as shown in a sequence diagram of FIG. 4 between the switch server and the agent application during a period from the time when the call was set up to the time when released. As shown on the right side in FIG. 4, however, it might happen that the sequence comes to an end just when "UniversalFailureConf" and "ClearConnectionConf" are issued before coming into a possible-of-calling status.

Therefore, the information totalizing server 23 creates a record to be outputted to the call information collecting log file in procedures which follow.

To begin with, the information totalizing server 23 retrieves, from the SW information collecting log file, a record (hereinafter referred to as a call specifying record) in which a content of "Primitive" defined as an item representing the status is coincident with any one of "Established", "UniversalFailureconf" and "ClearConnectionConf", and a value of the item "Time/Date" is minimum.

Then, if the content of the item "Primitive" of the thus retrieved call specifying record is "Established", the following completion call process is executed.

Completion Call Process (1) The retrieved record is stored as StartRec.

(2) A record, wherein "CallID" is the same as that of StartRec, a value of "Time/Date" is minimum and "Primitive" is "ConnectionCleard" ("Con.Cleared") or "Established", is retrieved from the records after StartRec onward (the records in which "Time/Date" is larger than "Time/Date" of StartRec).

(3') If "Primitive" in the retrieved record is "Established", StartRec is changed to that record, and the processing returns to the step (2) (the retrieval continues).

(3) If "Primitive" in the retrieved record is "ConnectionCleard", the record concerned is set as EndRec, and the processing proceeds to step (4).

(4) A record consisting of CallID, a start-of-call time, a calling user number, a calling terminal type, a called user number, a called terminal type, a call time, a call charge and a call completed indication, is created based on data in StartRec and EndRec, and outputted to the call information collecting log file (FIG. 2G).

More specifically, the information totalizing server 23 creates the record in which values as will hereinbelow shown are set in the respective items, and output this record to the call information collecting log file. Note that, in the following notation, "StartRec.item name" connotes data identified by an item name within StartRec, and "EndRec.item name" also connotes data identified by an item name within EndRec.

Call-ID=StartRec.CallID
Start-of-Call Time=StartRec.Time/Date
Calling User Number=StartRec.CallingDeviceID
Calling Terminal Type=Retrieved data from the environment data table using StartRec.CallingDeviceID
Called User Number=StartRec.CalledDeviceID
Called Terminal Type=Retrieved data from the environment data table using StartRec.CalledDeviceID
Call Time=EndRec.Time/Date—StartRec.Time/Date Call Charge=Value calculated from calltime and so on, based on data in rectangle section number table and distance-basis call time table.

Call Completion Indication=Normal completion Further, if the content of the item "Primitive" of the call specifying record retrieved is "UniversalFailure", the following uncompleted call process is executed.

Uncompleted Call (Pattern 1) Process (1) The notified record is stored as EndRec.

(2) A record having InvokeID identical with that of EndRec and having "Primitive" that is "MakeCall", is retrieved from the SW information collecting log file in sequence of reverse time (in such a sequence that the value of "Time/Date" becomes smaller) from EndRec.

(3) The retrieved record is set as StartRec, and a record in which the following data are set in the respective items, is created and then outputted to the call information collecting log file.

CallID=StartRec.ID
Start-of-Call Time (Time/Date)=StartRec.Time/Date
Calling User Number=StartRec.CallingDeviceID
Calling Terminal Type=Retrieved data from environment data table using StartRec.CallingDeviceID
Called User Number=Null
Called Terminal Type=Null
Call Time=0
Call Charge=0
Call Completion Indication=Abnormal end Further, the information totalizing server 23, if the content of the item "Primitive" of the call specifying record retrieved is "ClearConnectionConf", the following uncompleted call process is executed.

Uncompleted Call (Pattern 2) Process (1) The retrieved record is stored as EndRec.

(2) A record having "CallID" identical with that of StartRec and having "Primitive" that is any one of "ServiceInitiated" and "Originated", is retrieved from the SW information collecting log file in sequence of reverse time from EndRec.

(3)-1 If the record in which "Primitive" is "Originated" is retrieved, this record is set as OrgRec, and the retrieval in the step (2) continues.

(3)-2 If the record in which "Primitive" is "ServiceInitiated" is retrieved, this record is set as IniRec, and the retrieval in step (2) is ended.

(4) A record in which the following data are set in the respective items, is created and then outputted to the call information collecting log file.

CallID=EndRec.CallID
Start-of-Call Time=IniRec.Time/Date
Calling User Number=IniRec.CallingDeviceID
Calling Terminal Type=Retrieved data from environment data table using IniRec.CallingDeviceID
Called User Number=IniRec.CallingDeviceID (existence of OrgRec)=Null (non-existence of OrgRec)
Called Terminal Type=Retrieved data from environment data table using IniRec.CallingDeviceID (existence of OrgRec)=Null (non-existence of OrgRec)
Call Time=0
Call Charge=0
Call Completion Indication=Abnormal end The information totalizing server 23, after executing a process corresponding to the content of "Primitive" of the call specifying record, deletes the record having CallID on which the record for the call information collecting log file is created, from the SW information collecting log file. Then, the information totalizing server 23 again retrieves the call specifying record from the SW information collecting log file with its contents updated, and executes a process corresponding to the content of "Primitive" of the retrieved call specifying record. When the call specifying record can not be retrieved with a repetition of these processes, the process of creating the call information collecting log file is ended.

Then, the information totalizing server 23, when indicated to output the traffic information and the accounting information, edits the information stored in the call information collecting log file in accordance with a content of this indication, and outputs the same information.

Given next is an explanation of an operation of the information totalizing server 23 when indicated to create an application related call information log file (FIG. 2H). Note that the indication of creating the application corresponding call information log file contains a log creating target application name, and, when receiving the this creation indication, the information totalizing server 23 operates as follows.

(1) The information totalizing server 23 reads a first single record from the application information collecting log file identified by the designated log creating application name, and stores the read record as SppRec. Incidentally, when re-executing this process, the information totalizing server 23 reads a record next to the record read last time and stores this record as AppRec. Further, if the next record could not be read, the information totalizing server 23 finishes the process of creating the application related information log file.

(2) The information totalizing server 23 retrieves a record having CallID identical with that of AppRec from the call information collecting log file, and stores the retrieved record as CallRec.

(3) The information totalizing server 23 reads, from the scenario data file, contents (a citation target log name and a citation item name) of the first record in which the application name is coincident with the log creating target application name. When re-executing this process, the information totalizing server 23 reads a record next to the record read last time. Then, if the next record could not be read, the information totalizing server 23 re-executes the process from the step (1).

(4) If the citation target log name is a call information collecting log, the information totalizing server 23 reads the data identified by the citation item name, and outputs the same data as one-item data of the application related call information log file. If the citation target log name is an application information collecting log, the information totalizing server 23 reads the data identified by the citation item name within AppRec, and outputs the same data as item data of the application related call information log file.

(5) The information totalizing server 23 again executes the process from the step (3).

Note that the information totalizing server 23 finishes the application related call information log file creating process also when the record having CallID identical with that of AppRec could not be retrieved in the step (2). In this case, however, the above process is ended because of the fact that the contents of the call information collecting log file are not updated, and hence the information totalizing server 23 notifies an operator of this purport.

If, for example, the scenario data file is a file stored with nine sets of records relative to an agent application A shown in FIG. 3, and if the contents of the application information collecting log file and the call information collecting log file are coincident with those shown in FIG. 2D and 2G, the information totalizing server 23, when indicated to create the application related call information log file pertaining to the agent application A, operates as follows.

To start with, the information totalizing server 23 reads the first record in the application information collecting log file, and stores its content as AppRec. Subsequently, the information totalizing server 23 reads the record having CallID ("001" in this case) identical with that of AppRec from the call information collecting log file, and stores its content as CallRec.

Then, the information totalizing server 23 reads a content of the first record in which the application name in the scenario data file is the agent application A. The citation target log name to be read is "Call Information Collecting Log", and the citation item name is "Time/Date"Hence, the information totalizing server 23 outputs the data of the item "Time/Date" of CallRec as first item data of the first record in the application related call information collecting log file.

Subsequently, the information totalizing server 23 makes an attempt to read of the next record with the application name being the agent application A from the scenario data file. In this case, the "Call Information Collecting Log" is read as a citation target log name, and the "Calling User Number" is read as a citation item name. Therefore, the information totalizing server 23 outputs the data of the item "Calling User Number" of CallRec as next item data of the first record in the application related call information collecting log file.

Thereafter, the information totalizing server 23 executes the same process with respect to each of the third to ninth records relative to the agent application A in the scenario data file. As a result, the application related call information collecting log file is stored with records as shown in FIG. 2G.

Then, the information totalizing server 23 recognizes that it is impossible to read the record in which the application name is coincident with the log creating target application name from the scenario data file. Accordingly, the information totalizing server 23 ties to read the next record from the application information collecting log file. In this embodiment, however, the application information collecting log file is stored with only one record, and hence there is ended the process of creating the application related call information collecting log file.

As discussed above, the call control system provided in the call control management system in this embodiment executes, other than the call control, only the process of outputting the record indicating the call status to the call status information collecting log file, and the processes required for outputting the accounting information and the traffic information are implemented by the information totalizing server. Therefore, if the present call control management system is employed, it follows that the performance in connection to the call control does not deteriorate even when utilizing the totalizing function. Further, the construction is such that the accounting information and the traffic information are totalized by use of only the call information collecting log file, and hence memory resources are effectively utilized in the present call control management system. Moreover, in the case of adding the call control application, the call control application added can be structured to incorporate a function of outputting a record indicating a condition of executing the application without preparing the totalizing function for the application, and it follows that the information on the added application can be outputted simply by adding a certain number of records to the scenario data file.

Modified Embodiment

The call control management system in each embodiment can be modified in a variety of forms. For instance, the information totalizing server may be connected to the communication server and the call control system without using the LAN line, and the communication server, the call control system and the information totalizing server may be packaged into one apparatus. Further, the call control management system in each embodiment involves the use of agent application for creating the application information collecting log file peculiar to the system itself. If the call information collecting log file is so set as to be stored with the record containing the application name, however, it is feasible to use the agent application in such a form as to add the records to the same application information collecting log file by way of the above agent application. Further, even when the application information collecting log file is so set as to be stored with the record containing the application name, the agent application in the form for adding the records to the same application information collecting log file comes to be usable.

Moreover, the information totalizing server 23 in the call control management system in each embodiment is constructed to create the call information log file by obtaining only the required records from the database (the SW information collecting log file) within the communication server 21. As a matter of course, however, the information totalizing server 23 may be constructed to temporarily obtain all copies of the contents of the SW information collecting log file and create the call information collecting log file from these copies. In the thus constructed information totalizing server 23, however, a quantity of the information, which must be transferred via the LAN line, becomes larger than in the call control management system in the second embodiment. Hence, it might be considered that the communications between the terminals using the same LAN line are to be hindered. It is therefore desirable to adopt the construction of the call control management system as shown in the embodiment when using a medium usable by other devices as in the case of the LAN line in order to transfer and receive the information between the communication server and the information totalizing server.

It is apparent that, in this invention, a wide range of different working modes can be formed based on the invention without deviating from the spirit and scope of the invention. This invention is not restricted by its specific working modes except being limited by the appended claims.

What is claimed is:

1. A call control management system for performing communications via a telephone line network, comprising:
   a call control unit having a call status information log file for storing a call status record of each call showing a certain call status at a certain time, for implementing call control and outputting the call status record showing a status after a call transition to said call status information log file every time when the call status transition is made; and
   a call information management unit extracting the call status record relative to the same call from said call status information log file, creating a call information record containing at least a data which is convertible into a call charge on the basis of the extracted call status record, and storing the created call information record in the form of a report call information log file to reduce the load on the call status information log file.

2. A call control management system according to claim 1, wherein said call control unit allocates a unique call identification data to a new call when starting the control relative to the new call, indicates a status after the call transition each time when the call status transition is made, and outputs the call status record containing the call identification data allocated to the call to said call status information log file; and said call information management unit extracts the call status record pertaining to the same call from said call status information log file by use of the call identification data.

3. A call control management system according to claim 2, wherein said call information management unit extracts only the call status record needed for creating the call information record relating to the same call from said call status information log file.

4. A call control management system according to claim 1, wherein said call information management unit creates the call information record in said report call information log file which allows summing up of an accounting information and a traffic information, respectively, and outputs, upon indicated to output the accounting information or the traffic information, the call information record stored in the report call information log file showing a result of sum of the basis of the indication.

5. A call control management system according to claim 1, further comprising:

an application unit for controlling said call control unit in order to implement a service of connecting said telephone line network to a computer, said application unit having an application information log file for storing a record showing a content of the service implemented, and storing said application information log file with the record showing the content of the service when starting the service; and wherein said call information management unit, upon indicated to output information based on a service unit, outputs information relating to a designated service by combining the record stored in said application information log file with the call information record stored in the report call information log file.

* * * * *